(12) United States Patent
Hansen (10) Patent No.: US 6,476,990 B1
(45) Date of Patent: Nov. 5, 2002

(54) GENERAL PURPOSE DIGITAL READ CHANNEL ARCHITECTURE

(75) Inventor: Douglas Christian Hansen, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/477,229

(22) Filed: Jan. 4, 2000

(51) Int. Cl.[7] .................................................. G11B 5/09
(52) U.S. Cl. .............................. 360/32; 360/51; 360/46; 375/354; 341/155
(58) Field of Search ............................. 360/32, 51, 46; 375/354; 341/155, 132, 126

(56) References Cited

U.S. PATENT DOCUMENTS 5,262,907 A * 11/1993 Duffy et al. ............. 360/77.05
5,973,626 A    10/1999 Berger et al.

* cited by examiner

Primary Examiner—Alan T. Faber
(74) Attorney, Agent, or Firm—Brooks & Kushman P.C.

(57) ABSTRACT

A circuit and a method of operation for detecting a bit sequence from an analog waveform representing the bit sequence and at least one other parameter associated with the analog waveform are disclosed. Detection includes digitizing the analog waveform and at least one other parameter using at least one analog to digital converter. The resulting digital numbers are synchronized in time by a plurality of registers so that the outputs of the registers always change simultaneously. The outputs of the registers are concatenated to form an address. The address is input into a read-only memory that looks up a most likely bit detected that has been predetermined for that address and stored in the read-only memory. The bits read from the read-only memory by the addresses are output periodically to form the bit sequence.

16 Claims, 8 Drawing Sheets

GENERAL PURPOSE DIGITAL READ CHANNEL ARCHITECTURE

TECHNICAL FIELD

The present invention relates to a circuit and a method of determining a most probable bit sequence represented by an analog waveform received through a communication channel.

BACKGROUND ART

Current read channels use a variety of methods and circuits to detect a bit sequence transmitted from a source, or read from a medium. State of the art systems use error control coding to encode running blocks within the bit sequence prior to transmitting/recording the resulting data. At the receiving/reading end, a detector operates on a running block of the data to extract the encoded bit sequence. The encoded bit sequence is then decoded to produce the original bit sequence. This method allows the bit sequence to be distinguished from noise that may be introduced in the communication channel or in the storage media.

Popular circuits used in the communications field and the digital storage field are a convolution encoder and a Viterbi decoder (often called a "trellis decoder.") The convolution encoder maps "k" input bits into "n" transmission/recording bits producing a "k/n" rate code bitstream. Variable "k" is called a constraint length of the code. Values for constraint length "k" may range from two and up, with k=7 being the present industrial standard. Rate codes typically range from ½ to 16/17, with ½ and 1/3 rates commonly used in the communications field and higher rates commonly used in the digital storage field.

The Viterbi decoder operates on the received/read bits in multiple steps to determine the original input bits. As each new bit is received, the Viterbi decoder calculates an error probability for each transition between the prior possible sequences of bits received and the current possible sequences of bits received. The error probabilities form a trellis having multiple paths that branch with each new bit received. By summing the probable errors along each path of the trellis from a finite bit in the past to the new bit received, a path with the lowest cumulative error may be found. The Viterbi decoder then determines the most likely sequence of input bits from this lowest-error path. Longer lowest-error paths result in higher probability that the decoded bits are error free.

Limitations of Viterbi decoders are their ability to work with high speed data in real time and their ability to adapt to new algorithms. The Viterbi decoding algorithm requires a large number of computations for each new bit received. For high data rate read channels and/or long constraint lengths, these computations must be performed in high speed hardware circuits. Software programs executing in general purpose processors cannot meet the throughput requirements of high demand read channels. Dedicated Viterbi decoder integrated circuits are available commercially that can operate at data rates of up to 30 Mbps. However, these chips provide the read channel designer with a limited number of options for the actual decoding algorithm. Major change to the decoding algorithm require a complete redesign of the integrated circuits to implement the new algorithm.

DISCLOSURE OF INVENTION

The present invention is a method and a circuit for determining a bit sequence from an analog waveform representing the bit sequence, and at least one other parameter associated with the analog waveform. The method includes periodically converting the analog waveform and the at least one other parameter associated with the analog waveform into digital numbers. Both resulting digital numbers are concatenated to create an address used periodically to look up a bit from an array of bits stored in a memory. The stored bits are predetermined to be the most likely bit for each possible address. Finally, one addressed bit is output each period to form the bit sequence.

The other at least one parameter digitized for use as part of the address may vary depending upon the needs of the application. One possible other parameter is the average amplitude of the waveform envelope proximate to the current bit being detected. Another possible other parameter is the absolute amplitude of the waveform itself one or more bit cells ahead of and/or behind the current bit begin detected. Where the analog waveform is being read from a recoding media, the other parameter may include the velocity of the media moving past the read head. With tape media, the other parameter may also be the tension of the tape across the read head.

The at least one other parameter may be filtered and/or delayed in time as necessary. Filter types include an averaging filter to minimize the effects of minor fluctuations in the at least one other parameter. Time delays may also be applied to the current bit being detected to account for any latencies in the at least one other parameter.

A circuit that implements the present invention requires at least one analog to digital converter, two registers, a controller and a read-only memory containing the predetermined most likely bits stored by address. The at least one analog to digital converter is used to convert the analog waveform and the at least one other parameter into digital form. The registers store the resulting digital numbers so that they are available simultaneously. Outputs from the registers are connected to the address input of the read-only memory. The controller provides timing commands for the at least one analog to digital converter and the registers based upon an external clock signal synchronized to the analog waveform. As each new address is presented to the read-only memory, the appropriate bit is output from the read-only memory thereby forming the bit sequence.

The circuit may contain a filter between the at least one analog to digital converter and the appropriate register to average the at least one other parameter. A series of shift registers may be included to time delay the current bit being detected to synchronize with other parameters converted later.

Accordingly, it is an object of the present invention to provide a method for determining a bit sequence from an analog waveform encoding the bit sequence and at least one other parameter associated with the analog waveform. The method includes a look up function to find the most likely bits in the bit sequence from among a set of predetermined most likely bits.

Another object of the present invention is to provide a circuit that determines a bit sequence from an analog waveform representing the bit sequence, at least one other parameter associated with the analog waveform, and a clock signal associated with the analog waveform. At the core of the circuit is a read-only memory storing a set of predetermined most likely bits as a function of an address.

These and other objects, features and advantages will be readily apparent upon consideration of the following detailed description in conjunction with the accompanying drawings

BEST MODE FOR CARRYING OUT THE INVENTION

The present invention operates on the basis that any finite block of bits sampled from a bit sequence will only have a finite number of combinations of logical ones and logical zeros. By entering every possible finite block combination through a model or an actual communication/storage system, the most probable output (in digital form) at the far end of a communication channel/media can be determined. A lookup table can then be created using this information linking each output of the communication channel/media with a most likely logical one or logical zero for a select bit position from within the finite block. From this point forward, every new output received from the communication channel/media can be quickly converted into the most likely original bit using the lookup table.

Figure 1:
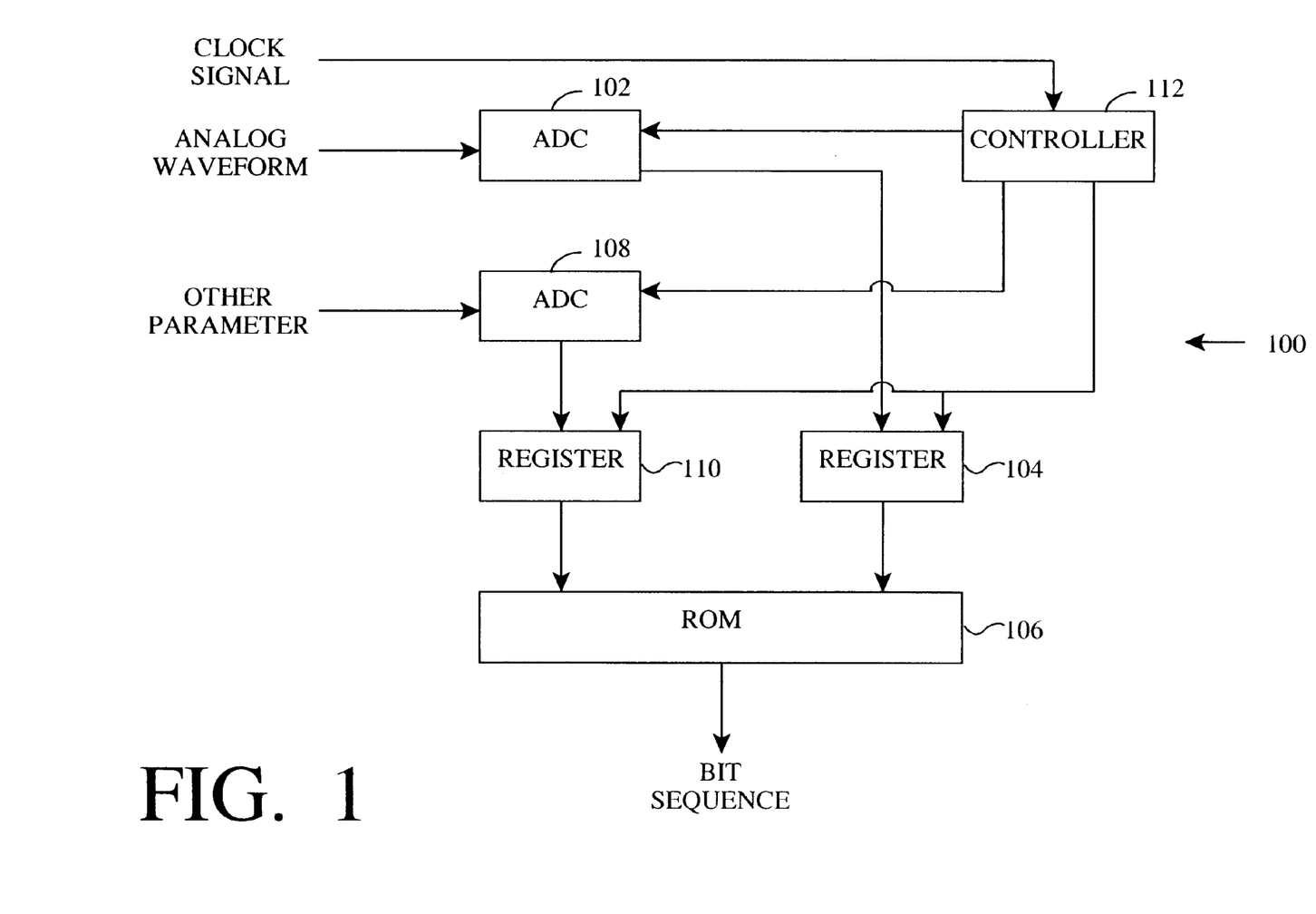
FIG. 1 is a block diagram of a detector circuit implementing the present invention.
Figure 2:
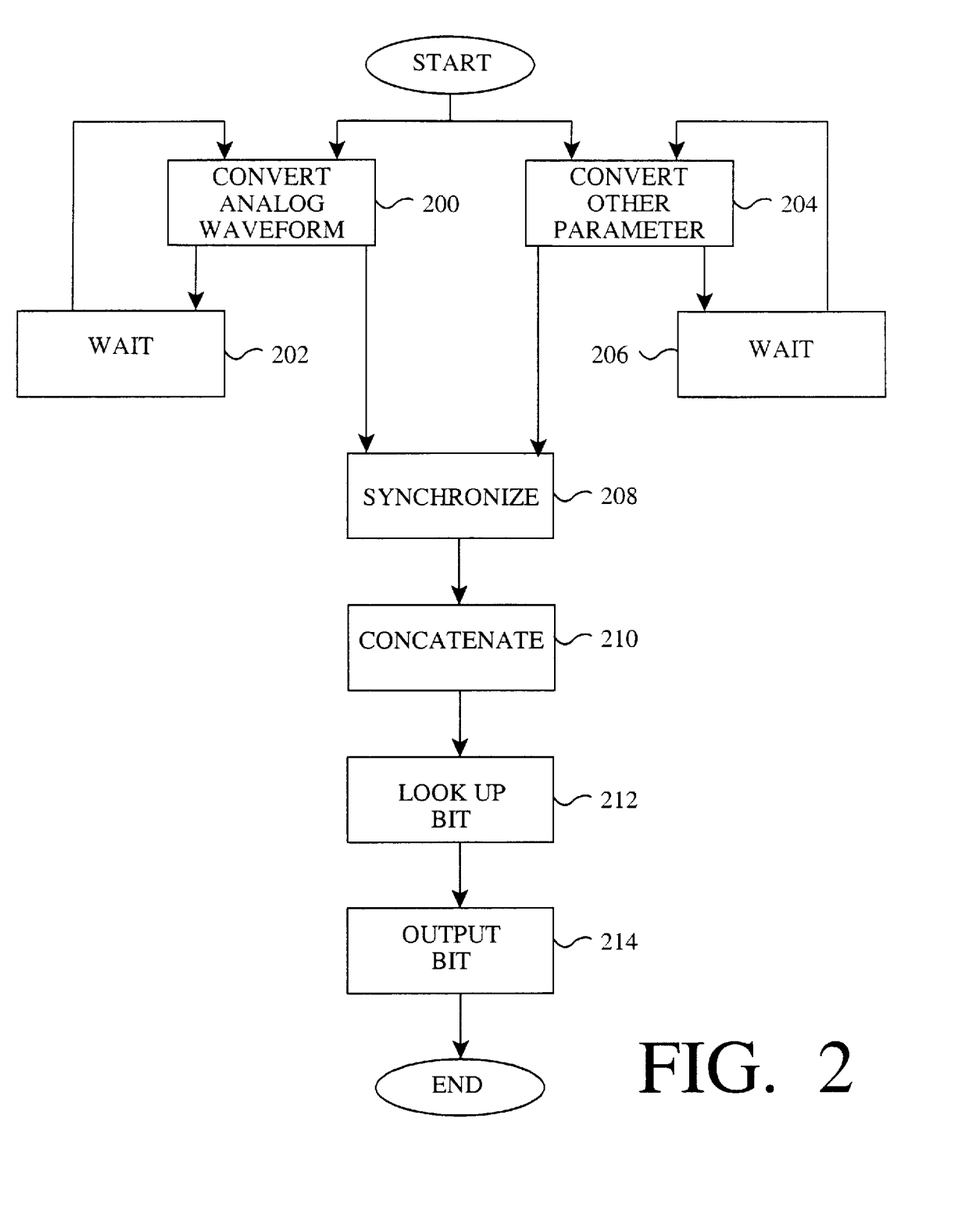
FIG. 2 is a flow chart of a method of detecting in accordance with the present invention.

FIG. 1 and FIG. 2 is a block diagram of a detector circuit, and a flow diagram of a method of operation respectively that implement the present invention. Referring to FIG. 1, the detector circuit 100 has multiple inputs, an analog waveform, a clock signal, and at least one other parameter associated with the analog waveform. An output of the detector circuit 100 is a bit sequence. The analog waveform is a representation of the bit sequence. Analog waveform consists of multiple bit cells with each bit cell representing one bit of the bit sequence. The clock signal is synchronized to the analog waveform to distinguish each bit cell within the analog waveform. The bit cell being detected by the detector circuit 100 at any given time is referred to as the current bit cell. The clock signal is entered to the detector circuit 100 independent from the analog waveform even through it may have been extracted from the analog waveform by an external circuit (shown in FIG. 7). The at least one other parameter will vary depending upon the detector circuit 100 application. For example, in a magnetic tape read channel application, the at least one other parameter may be the velocity of the magnetic tape relative to a magnetic read head. In a similar example, the at least one other parameter may be a tension on the magnetic tape segment that is traversing the read head. At least one other parameter may also be a parameter of the analog waveform itself. Examples include the amplitude of the analog waveform shifted earlier and/or later in time, and an average peak amplitude over a predetermined region of the analog waveform. Overall, the at least one other parameter may be any parameter that indicates when the analog waveform deviates from ideal.

The analog waveform is input to a first analog to digital converter (ADC) 102. First ADC 102 is a high speed converter having medium to low resolution. Conversion rates of the first ADC 102 must be at least as great as the bit rate of the analog waveform, often millions of conversions per second. Conversion resolution is usually, although not necessarily, in a range of three to eight bits. Valid output from the first ADC 102 is stored in a first register 104. The digitized amplitude of the current bit cell is referred to as a current number. Outputs of the first register 104 are connected to some address lines of a read-only memory (ROM) 106. This causes the current number to form part of the address input into ROM 106.

The at least one other parameter is digitized by a second analog to digital converter 108. Conversion speed and resolution of the second ADC 108 are chosen to match the characteristics of the parameter being converted. Consider for example, an application where the at least one other parameter is the velocity of a magnetic tape and variations of greater than 0.01% for longer than one millisecond are important. Here the second ADC 108 must have a conversion rate of at least 1000 hertz at a resolution of at least fourteen bits. Valid output from the second ADC 108 is stored in a second register 110 and is referred to as the at least one other number. Outputs of the second register 110 are connected to the remaining address lines of ROM 106. This causes the at least one other number to form the remainder of the address input into ROM 106.

ROM 106 stores one predetermined most likely bit (a logical one or a logical zero) for each possible address. For each new address input into the ROM 106 a respective bit is output. The string of consecutive bits output from ROM 106 form the bit sequence that the detection circuit 100 is designed to recover from the analog waveform. Commercial high speed solid state memory devices are currently available with a capacity of up to 8 Mbit. An 8 Mbit memory device has a 23-bit wide address range.

In the preferred embodiment, ROM 106 is a programmable and erasable memory such as an electronically erasable programmable read-only memory (EEPROM), an ultraviolet programmable read-only memory (UVPROM), or other similar nonvolatile memory. The programmable feature allows the ROM 106 to be installed in the detection circuit 100 prior to determination of the most likely bits for each address. The erasable feature allows the ROM 106 to be reprogrammed to store a different set of most likely bits predetermined for another detection algorithm.

A controller 112 is provided to schedule conversions and storage updates within the detection circuit 100. Controller 112 triggers first ADC 102 periodically to convert the analog waveform into the current number. Typically, although not necessarily, controller 112 triggers first ADC 102 once per bit cell in approximately the center of each bit cell of the analog waveform. The clock signal is input into the controller 112 to synchronize the controller 112 with the bit cells. Controller 112 also triggers the second ADC 108 periodically. Here the triggering may or may not be dependent upon the clock signal depending on the nature of the at least one other parameter. In the magnetic tape velocity example from above, no need exists to synchronize the second ADC 108 conversions with the analog waveform. In other applications such synchronization may be necessary.

Controller 112 provides command signals to the first and second registers 104 and 110 respectively to cause them to update their contents. This causes both portions of the address provided to the ROM 106 to change simultaneously even when the first ADC 102 and second ADC 108 are operating asynchronously with respect to each other.

FIG. 2 is a flow diagram of a method of detecting the bit sequence. Detection involves the periodic conversion of the analog waveform into the current number, as shown by the conversion loop created by blocks 200 and 202. The wait period shown in block 202 is typically, although not necessarily, set to one bit cell period. This approach results in one conversion in every bit cell, and thus for every bit of the original bit sequence within the analog waveform.

Conversion of the at least one other parameter, block 204, is performed simultaneously with the conversion of the analog waveform. The time between consecutive conversions, as indicated by block 206, may be a simple fixed period or a complex pattern. An example of a simple fixed period is one conversion at the first quarter of each bit cell. A complex pattern example is one conversion at 10% into each bit cell and a second conversion at 90% into the bit cell. Here the times between consecutive conversions alternate between 80% and 20% of the bit cell period.

Periodically the current number and the at least one other number are synchronized with each other in time, as shown by block 208. This function eliminates any transitory addresses that would otherwise be created when the current number is updated at a slightly different time from the updating of one or more of the at least one other numbers.

After each synchronization, the current number and at least one other number are concatenated to form an address, as shown in block 210. Each address is then used to look up a most likely bit predetermined for that address, as shown in block 212. Finally in block 214, the most likely bit is output. Since the address is updated periodically, the most likely bit output is also updated periodically. The string of consecutive most likely bits output periodically form the bit sequence.

Figure 3:
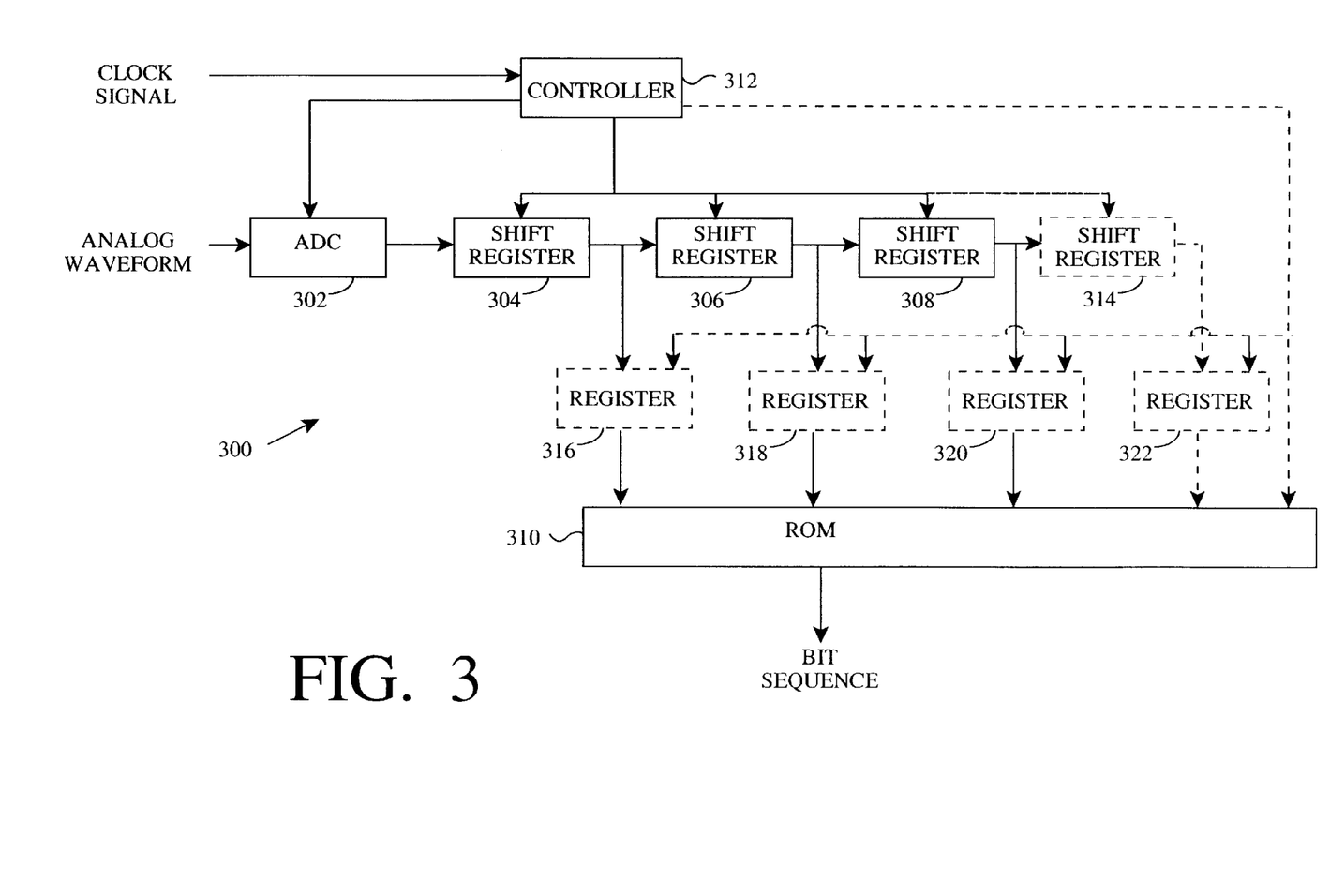
FIG. 3 is a block diagram of a second embodiment of the detector circuit.

A second embodiment of the detector circuit 300 is shown in FIG. 3. Here the at least one other parameter is part of the analog waveform. In particular, the at least one other parameter is the analog waveform amplitude sequentially generated at two different times shifted from that portion of the analog waveform amplitude that produces the current number. This detector circuit 300 requires one ADC 302 to convert the analog waveform periodically. The output of ADC 302 is connected to a first shift register 304 of a series of three shift registers 304, 306 and 308. Outputs from the three shift registers 304–308 are connected to input address lines of a ROM 310. As a result, the address seen by the ROM 310 is a concatenation of the digitized numbers stored in the three shift registers 304–308.

Controller 312 is connected to the ADC 302 and three shift registers 304, 306 and 308 to provide conversion triggers and shift commands respectively. Controller 312 receives the clock signal as an input and uses it to control timing of each conversion trigger to the ADC 302. Timing of the shift commands are based upon the ADC 302 latency from receiving the trigger until a valid output is produced. A common shift command is provided to all three shift registers 304–308 simultaneously. This causes all three shift registers 304–308 to change their outputs simultaneously causing one uniform change in the addresses seen by ROM 310 instead of two or three rapid changes. ROM 310 outputs a new bit for each new address provided at its address input.

This circuit can implement several different detection algorithms by loading different lookup tables into the ROM 310. In three of the detection algorithms, controller 312 times ADC 302 triggering and shift commands to the shift registers 304–308 such that three consecutive bit cells of the analog waveform are digitized and stored in the three shift registers 304–308 respectively. The current bit cell being detected, that is to say the bit cell converted into the current number, may be allocated to any of the three shift registers 304–308, depending upon the detection algorithm being implemented. The two other parameters are the amplitudes of the other two bit cells.

For the examples that follow, the digitized values for these two other parameters (bit cells) are referred to as a first other number and a second other number respectively. In a first example detection algorithm, the first other number is stored in the last shift register 308, the second other number is stored in the middle shift register 306, and the current number is stored in the first shift register 304. The concatenated address of first other number, second other number, and current number respectively is entered into ROM 310. ROM 310 then outputs the most likely bit detected for the current number (current bit cell).

A second example detection algorithm defines the first other number as the digitized amplitude of the analog waveform one bit cell before the current bit cell, and the second other number as the digitized amplitude of the analog waveform one bit cell after the current bit cell. Here the last shift register 308 stores the first number, the middle register 306 stored the current number, and the first shift register 304 stores the second other number. ROM 310 acts upon a concatenated address of first other number, current number, and second other number respectively to output the most likely bit detected form the current number (current bit cell).

A third example detection algorithm defines the first other number and the second other number as the digitized amplitudes of the analog waveform one bit cell and two bit cells after the current bit cell. Now the concatenated address consists of the current number, first other number and second other number respectively.

Other detection algorithms may be implemented with minor modifications to the hardware architecture shown in FIG. 3. For example, a fourth shift register 314 (shown in phantom) may be connected between the last shift register 308 and the ROM 310. Here, the at least one other parameter is now the amplitude of three other bit cells of the analog waveform shifted in time before and/or after the current bit cell. In another example, controller 312 may be programmed to trigger the ADC 302 to convert the analog waveform amplitude multiple times within the current bit cell. This detection algorithm is useful when each bit cell of the analog waveform is encoded (e.g., Manchester encoding) is subdivided into multiple periods, each requiring independent conversion. Controller 312 must also be connected to ROM 310 to inform ROM 310 when all converted numbers have been shifted into their respective shift registers 304–308 to create a valid concatenated address. In an alternative approach, additional registers 316–320 (shown in phantom) may be added between the shift registers 304–308 and 314 and the ROM 310 to hold the concatenated address constant while the shift registers 304–308 and 314 are loading the next address.

Figure 4:
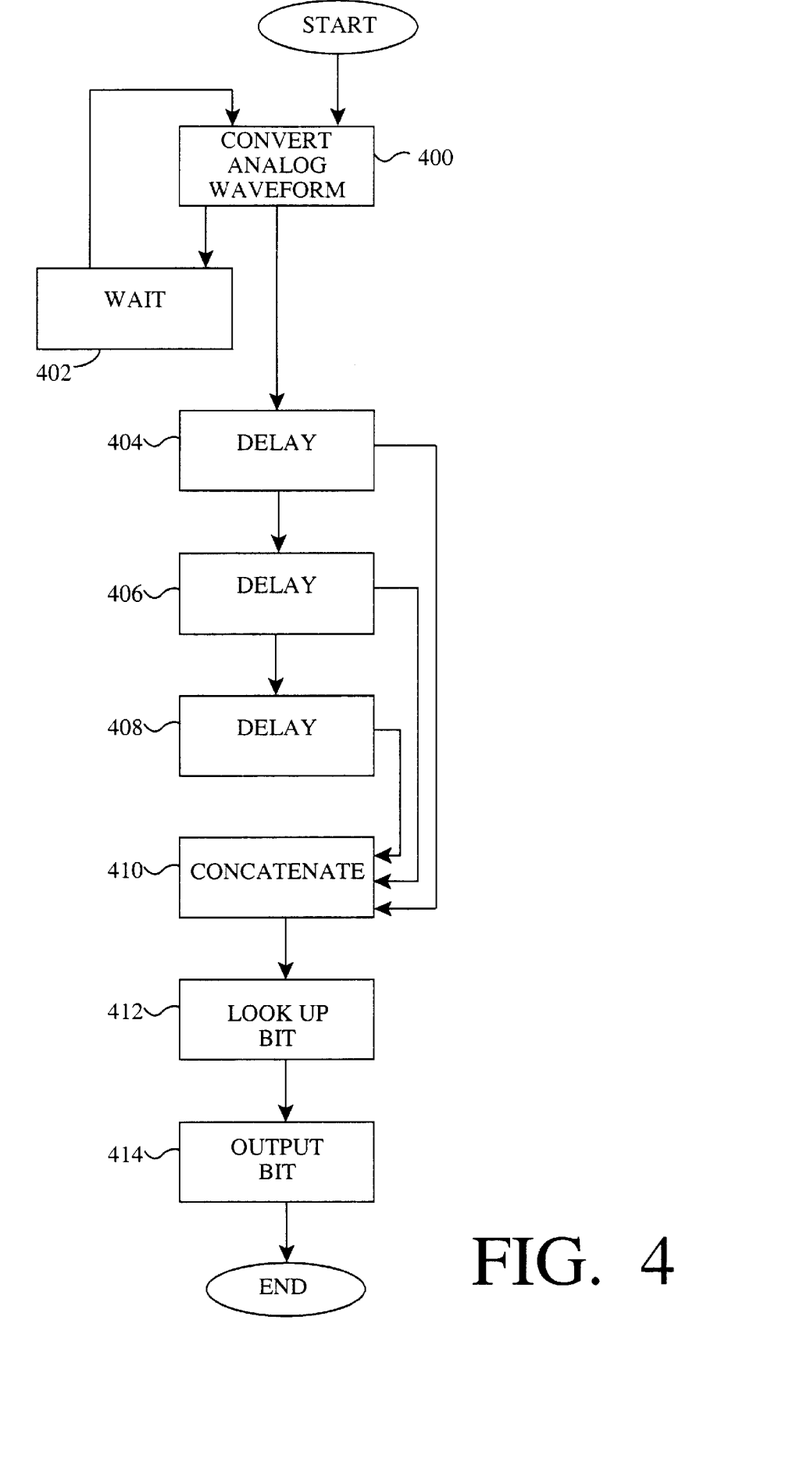
FIG. 4 is a flow diagram of a second method of detecting.

FIG. 4 is a flow diagram of a method of detecting as implemented by the detection circuit 300. The method starts with the conversion of the analog waveform into a digital number, as shown in block 400. The conversion is repeated periodically, as indicated by block 402. Synchronization of three consecutive conversions made at three different times is accomplished by three delay functions 404, 406 and 408. The earliest digital number is delayed three times after conversion 400. The middle digital number is delayed twice after conversion 400. Finally, the latest digital number is delayed for a predetermined amount of time to allow its conversion 400 to complete.

The three delayed digital numbers are then concatenated to form an address, as shown in block 410. A look up function, block 412, then finds a most likely bit detected for this address from a predetermined table of most likely bits. Finally, the most likely bit is output as the next bit of the bit sequence, as shown in block 414.

As each subsequent bit cell of the analog waveform is converted 400, the earliest number is discarded, the middle number is delayed 408 one more time making it the earliest number, the latest number is delayed 406 one more time making it the middle number, and the most recently converted number is delayed a first time 404 making it the latest number. All three numbers are concatenated to form a new address, block 410. The new address is used to look up the next most likely bit detected, block 412. Finally, this next most likely bit is output in continuation of the bit sequence, block 414.

Figure 5:
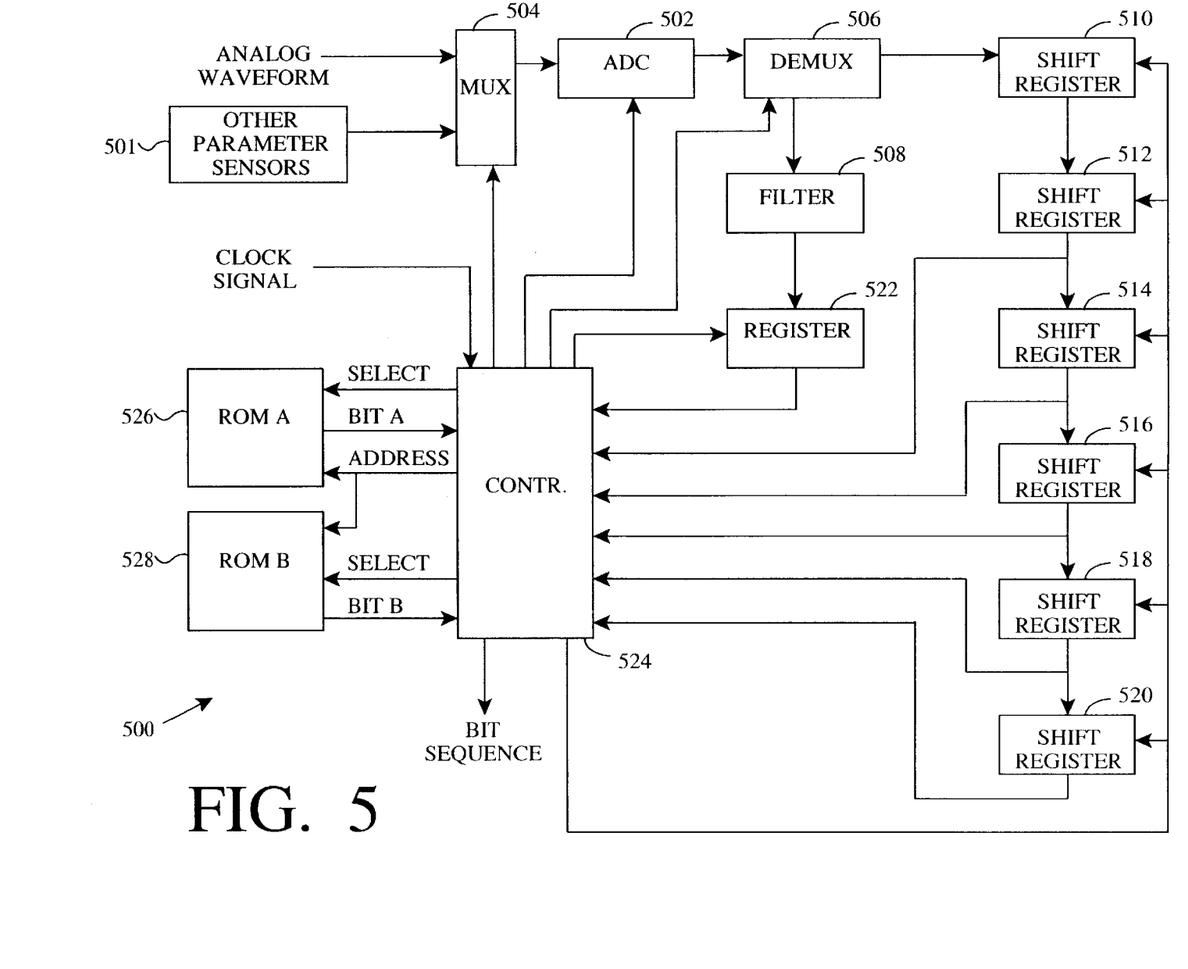
FIG. 5 is a block diagram of a third embodiment of the detector circuit.

FIG. 5 is a block diagram of a third embodiment of the detection circuit 500. In this embodiment, the at least one other parameter is multiple parameters with some being embedded within the analog waveform, and others being external to the analog waveform. The other parameters external to the analog waveform are measured by sensors 501. The analog waveform and the external other parameters are provided to ADC 502 through a multiplexer (MUX) 504. A demultiplexer (DEMUX) 506 is connected to the output of the ADC 502. Demultiplexer 506 routes the digitized numbers of the external parameters to a filter 508, and the digitized numbers of the analog waveform to a series of shift registers 510–520. As in the detector circuit 300 shown in FIG. 3, all of the shift registers 510–520 are linked together to shift simultaneously from a common shift command. Synchronization of the filter 508 output with the shift register 510–520 outputs is provided by a register 522. Outputs of the last five shift registers 512–520 and the register 522 are concatenated to form an address.

In detection circuit 500, the concatenated address exceeds the address input range of a single read-only memory device. Consequently, the concatenated address is supplied to the controller 524. Controller 524 uses the most significant address to select between two ROMs 526 and 528. If the most significant address bit is a logical zero, then ROM A 526 is selected and ROM B 528 is deselected. If the most significant address bit is a logical one, then ROM A 526 is deselected and ROM B 528 is selected. (Additional ROMs may be added as necessary to account for the full concatenated address range.) The remaining bits of the address (the subaddress) are applied to both ROMs 526 and 528. The selected ROM 526 or 528 returns the most likely bit detected to the controller 524. Controller 524 then outputs the most likely bit from the selected ROM 526 or 528 to form the bit sequence.

This circuit can also decode the bit sequence in the controller 524 and ROMs 526 and 528. Consider an encoding scheme that maps two data bits into five bits for transmission/storage. Now the five digital number stored in shift registers 512–520 represent the two data bits. Controller 524 applies the full concatenated address from the five shift registers 512–520 and the register 522 to both ROM A 526 and ROM B 528. (The input address range of the ROMs 526 and 528 must be sufficiently large to accommodate the address range, or the resolution of the digital numbers used to create the address must be reduced accordingly.) ROM A 526 responds to the address with one most likely bit of the two data bits for that address. while ROM B 528 responds with the other most likely bit of the two data bits. Controller 524 then outputs the two most likely bits in either serial or parallel form.

Figure 6:
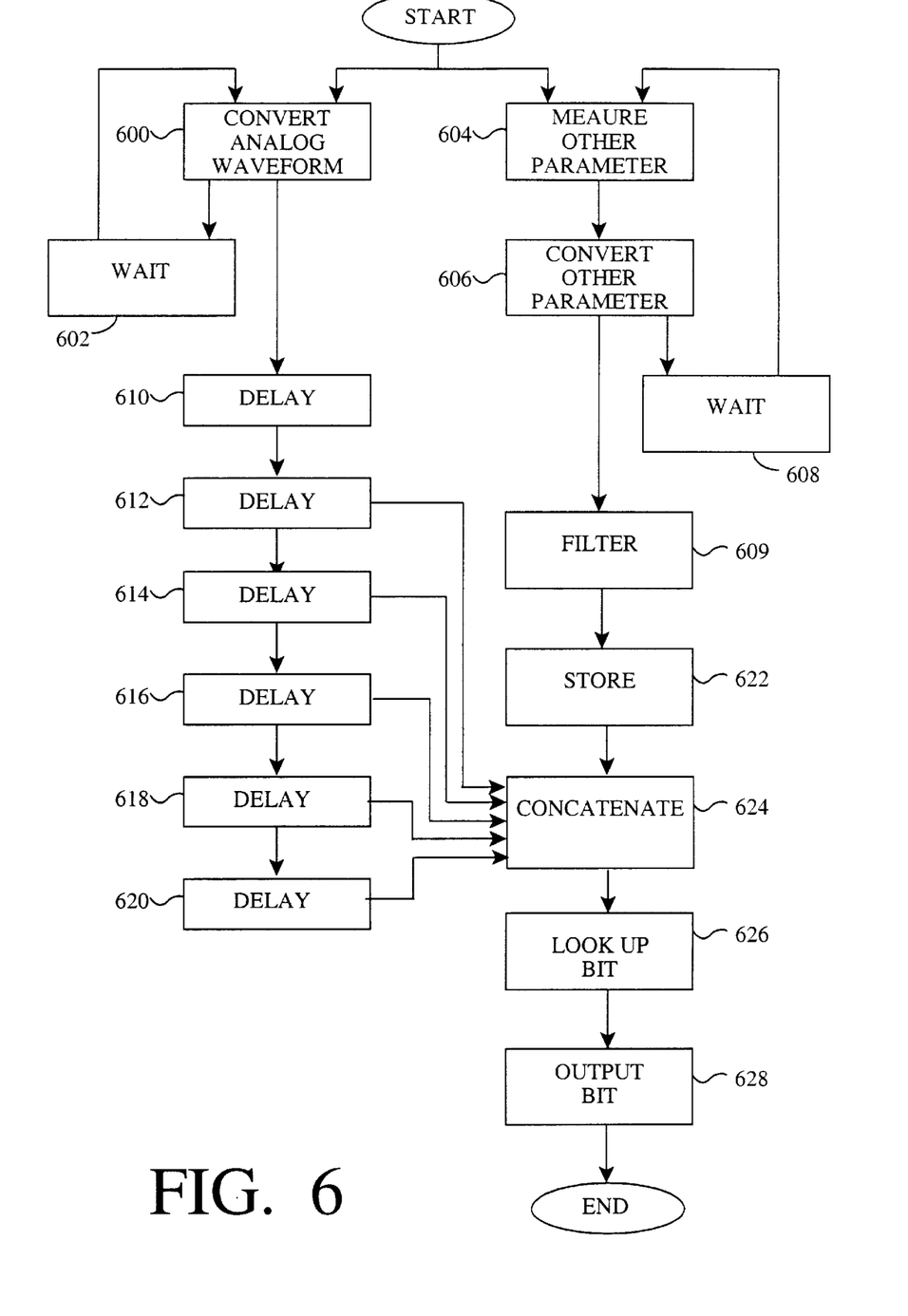
FIG. 6 is a flow diagram of a third method of detecting.

FIG. 6 is a flow diagram of a method of detection implemented by the detection circuit 500. This method starts with the periodic conversion of the analog waveform to digital form, as shown by blocks 600 and 602. Meanwhile, the at least one other parameter external to the analog waveform is periodically measured and periodically converted to digital form, as show by blocks 604, 606 and 608. The digitized at least one other parameter is then filtered, as shown in block 609. Filtering may be time averaging, amplitude clipping, noise squelching, or any other filter application known in the art.

Synchronization of the digitized numbers from the analog waveform and the filtered number of the at least one other parameter is provided by the delay functions, blocks 610–620 and the store function, block 622. With all parts of the address available simultaneously, the various digitized numbers are concatenated to form the address, as shown in block 624. Lookup function, block 626, then finds the most likely bit detected for the address from a table of predetermined most likely bits. Finally, the addressed most likely bit is output as part of the bit sequence, as shown in block 628.

Generation of the lookup table stored in the ROMs can be accomplished theoretically by calculations, or empirically by sampling large amounts of random data. Theoretical calculations involve modeling the transformations of every possible valid combination of bits in a finite length block of bit cells. The transformations include conversion of every valid finite block into an analog waveform, through the communication channel or storage media, conversion back into digital numbers, and ending with concatenation to form an address. The effects of the at least one other parameter and any anticipated noise must also be taken into account by the modeling. The modeling may also be repeated several times with the timing between the clock signal and the analog to digital conversions altered slightly each time to simulate jitter. Sorting the modeling results by address gives a picture of each starting bit combination that results in the same address. Analysis of these starting bit combinations should identify the most likely bit for each address. If the results are unsatisfactory then the algorithm may be adjusted in the model and the process repeated.

Another method of determining the lookup table entries is to build a prototype of the detector circuit and then enter a large amount of known random data in analog waveform format, the at least one other parameter, and the clock signal. Each address created by the prototype detector circuit is then correlated with the finite block of known random data that resulted in that address and stored. This process is continued until a statistically significant amount of addresses have been stored. Next, the finite blocks of known random data are sorted by correlating address and analyzed. For each address one most likely bit should be identifiable. If the results are unsatisfactory then the prototype detector circuit can be modified and the process repeated.

Figure 7:
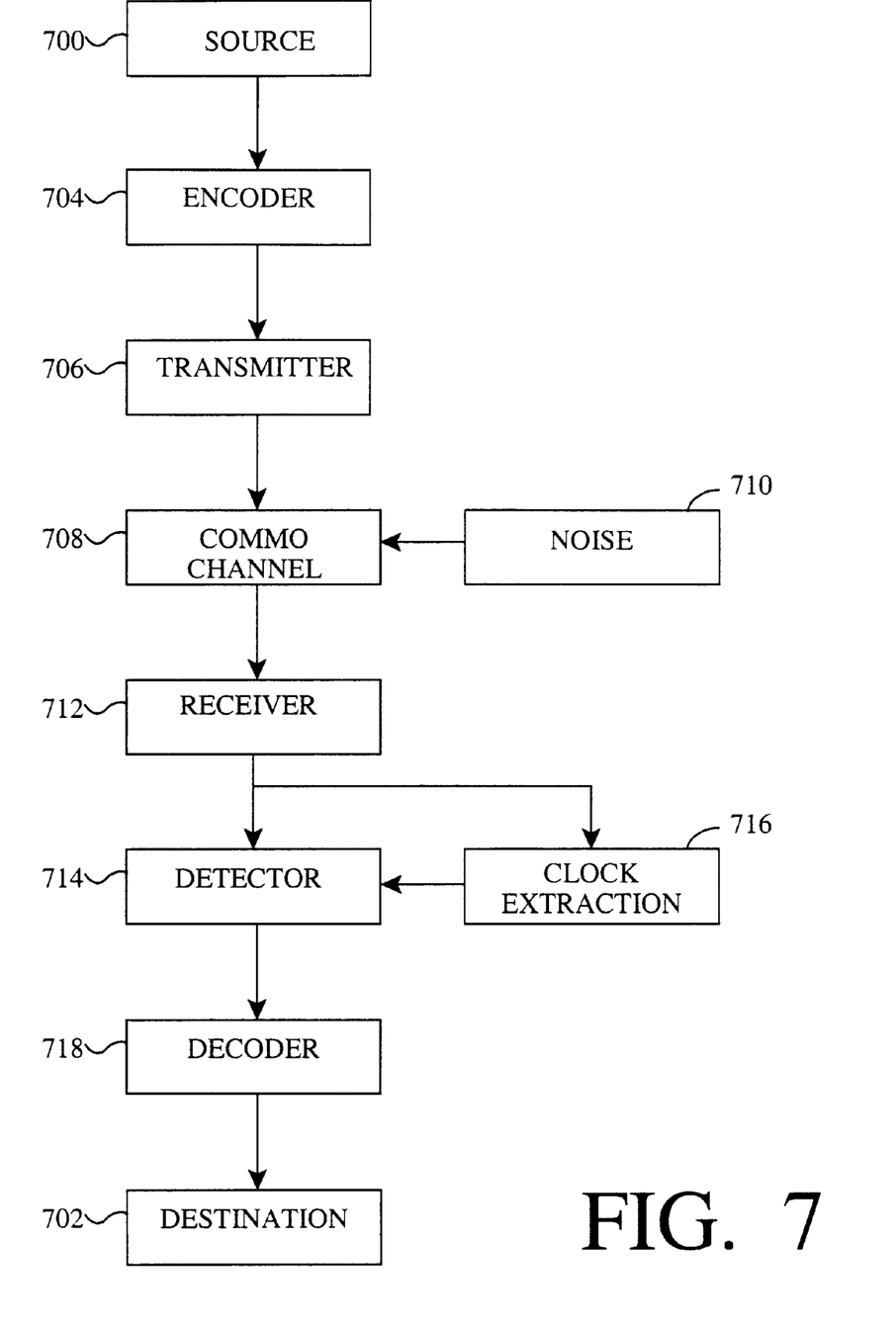
FIG. 7 is a block diagram of a communication system incorporating the detector circuit.
Figure 8:
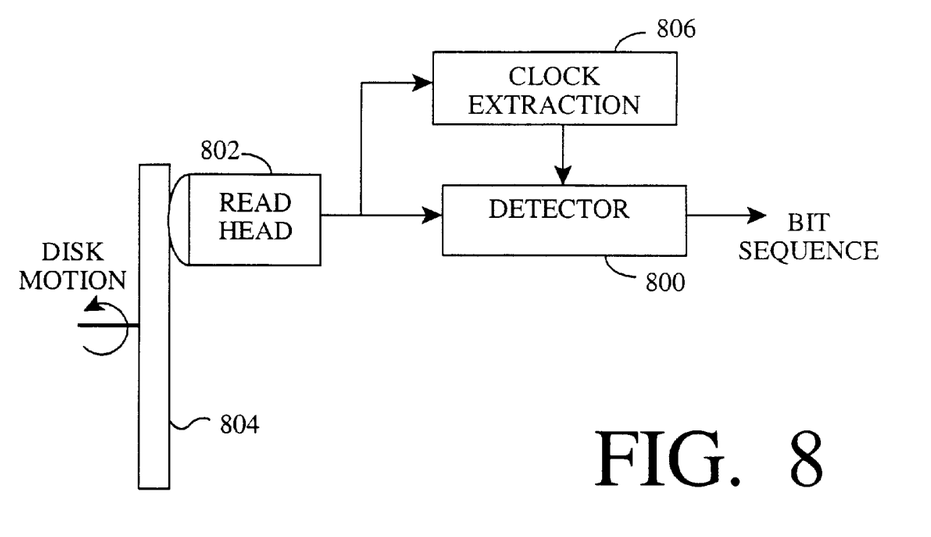
FIG. 8 is a block diagram of a disk read channel incorporating the detector circuit.
Figure 9:
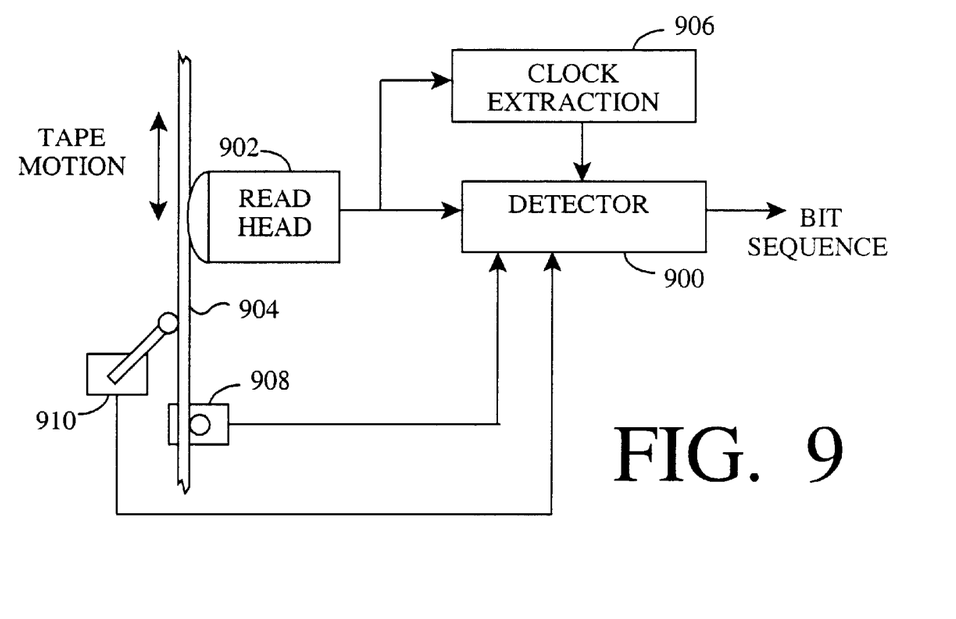
FIG. 9 is a block diagram of a tape read channel incorporating the detector circuit.

FIGS. 7, 8 and 9 are block diagrams of sample systems incorporating the detection circuit of the present invention. FIG. 7 is a block diagram of a typical communication system that sends data from a source 700 to a destination 702. Data provided by the source 700 is encoded (e.g., 8b10b encoding, convolution encoding, run length limited encoding, and the like) into a bit sequence by an encoder 704 and then broadcast by a transmitter 706 through a communication channel 708. While in the communication channel 708, the encoded data may be subjected to noise 710. A receiver 712 removes the noisy encoded data from the communication channel 708. The output of the receiver 712 is the analog waveform entered into the detector circuit 714. The analog waveform is also provided to a clock extraction circuit 716 that generates a clock signal synchronized with the bit sequence represented by the analog waveform. This clock signal is entered into the detector circuit 714. Detector circuit 714 may be any of the detector circuits and alternative embodiments described earlier, or any circuit that implements the detection methods and alternative embodiments also described earlier. Detector circuit 714 determines each most likely bit represented by the analog waveform and outputs the resulting bit sequence to a decoder 718. Within the error rejection capabilities of the detection algorithm lookup table loaded within the detection circuit 714, the bit sequence received by the decoder 718 will be the same as the bit sequence output by the encoder 704. Decoder 718 then converts the bit sequence back into the original data and then provides the converted data to the destination 702.

FIG. 8 is a block diagram of a disk storage system incorporating a detector circuit 800 as part of a read channel. Here, read head 802 transforms magnetic information stored on a disk 804 into the analog waveform. The analog waveform is supplied to both the detection circuit 800 and a clock extraction circuit 806. Clock extraction circuit 806 extracts a clock signal from the analog waveform and then provides the clock signal to the detection circuit 800. Detection circuit 800 digitizes the analog waveform to generate digital numbers, synchronizes the digital numbers, looks up the most likely bit detected, and outputs the looked up bit.

FIG. 9 is a block diagram of a tape storage system incorporating a detector circuit 900 as part of a read channel. A read head 902 generates the analog waveform from magnetic information stored on a magnetic tape 904. The analog waveform is supplied to both the detector circuit 900 and a clock extraction circuit 906. Clock extraction circuit 906 extracts a clock signal from the analog waveform then provides the clock signal to the detector circuit 900. Two additional sensors are used to measure the other parameters associated with the analog waveform to the detection circuit 900. One sensor is a velocity sensor 908 that measures the velocity of the magnetic tape 904 relative to the read head 902. This information is useful in the detection algorithm when the read head 902 output voltage is sensitive to the velocity of the magnetic tape 904. Another sensor is a tension sensor 910. Tension sensor 910 measures the tension on the magnetic tape 904 passing over the read head 902.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining a bit sequence from by an analog waveform representing the bit sequence and at least one other parameter associated with the analog waveform, the method comprising:

periodically converting a current amplitude of the analog waveform into a current number;

converting at least one other parameter associated with the analog waveform into at least one other number;

synchronizing in time the current number and the at least one other number in response to each conversion of the analog waveform to the current number;

concatenating the current number and the at least one other number to form an address in response to the current number and the at least one other number being synchronized;

addressing a memory with the address in response to concatenating the current number and the at least one other number, the memory storing a respective bit predetermined for each address; and outputting each respective bit addressed from the memory to form the bit sequence.

2. The method of claim 1 further comprising filtering the at least one other number prior to concatenating the current number to the at least one other number.

3. The method of claim 2 wherein the at least one other parameter includes a plurality of peak amplitudes of the analog waveform proximate to the current amplitude of the analog waveform, and wherein filtering includes amplitude averaging the plurality of peak amplitudes.

4. The method of claim 1 wherein the current number and the at least one other number are sequentially generated, the method further comprising delaying the current number prior to concatenating the current number to the at least one other number to synchronize the current number and the at least one other number to form the address.

5. The method of claim 4 wherein the at least other parameter includes at least one other amplitude of the analog waveform converted proximate to the current amplitude of the analog waveform.

6. The method of claim 1 wherein the analog waveform is stored in a media, the method further comprising reading the analog waveform from the media prior to converting the amplitude of the analog waveform to the current number.

7. The method of claim 6 wherein the at least one other parameter includes a velocity of the media, the method further comprising measuring the velocity of the media to produce the at least one other parameter prior to converting the at least one other parameter to the at least one other number.

8. The method of claim 6 wherein the media is a tape and the at least one other parameter includes a tension on the tape, the method further comprising measuring the tension on the tape to produce the at least one other parameter prior to converting the at least one other parameter to the at least one other number.

9. A circuit for determining a bit sequence from an analog waveform representing the bit sequence, at least one other parameter associated with the analog waveform, and a clock signal synchronized with the bit sequence as represented by the analog waveform, the circuit comprising:

at least one analog to digital converter receiving the analog waveform and the at least one other parameter, the at least one analog to digital converter being operative to convert a current amplitude of the analog waveform and the at least one other parameter into a current number and at least one other number respectively;

a plurality of registers connected to the at least one analog to digital converter and operative to store separately the current number and the at least one other number respectively;

a controller connected to the at least one analog to digital converter and the plurality of registers, and receiving the clock signal, the controller being operative to trigger the at least one analog to digital converter to convert the current amplitude of the analog waveform and to convert the at least one other parameter in response to the clock signal, and the controller also being operative to command the plurality of registers to update the current number and the at least one other number being stored after completion of the analog waveform conversion; and a read only memory having a plurality of bits selectable by an address for output, the read only memory being connected to the plurality of registers such that the current number and the at least one other number form the address, and the read only memory further being operative to output the bit sequence as selected by the addresses from the plurality of bits.

10. The circuit of claim 9 further comprising a filter connected between the at least one analog to digital converter and at least one register of the plurality of registers.

11. The circuit of claim 10 wherein the at least one other parameter includes a plurality of peak amplitudes of the analog waveform converted proximate to conversion of the current amplitude of the analog waveform and wherein the filter amplitude averages the plurality of peak amplitudes.

12. The circuit of claim 9 wherein the current number and the at least one other number are sequentially generated by the analog to digital converter, and the plurality of registers includes a plurality of shift registers having a first shift register of the plurality of shift registers connected to the analog to digital converter and at least one other shift register of the plurality of shift registers connected in series to the first shift register to synchronize in time the current number with the at least one other number.

13. The circuit of claim 12 wherein the at least one other parameter includes at least one other amplitude of the analog waveform converted proximate to conversion of the current amplitude of the analog waveform.

14. The circuit of claim 9 wherein the analog waveform is stored in a media, the circuit further comprising a read head adjacent to the media and connected to the at least one analog to digital converter, the read head being operative to read the analog waveform from the media.

15. The circuit of claim 14 wherein the at least one other parameter includes a velocity of the media moving past the read head, the circuit further comprising a velocity sensor coupled to the media and connected to the at least one analog to digital converter, the velocity sensor being operative to measure the velocity of the media moving past the read to produce the at least one other parameter.

16. The circuit of claim 14 wherein the media is a tape and the at least one other parameter includes a tension on the tape, the circuit further comprising a tension sensor coupled to the tape and connected to the at least one analog to digital converter, the tension sensor being operative to measure the tension on the tape to produce the at least one other parameter.

* * * * *